UNITED STATES PATENT OFFICE.

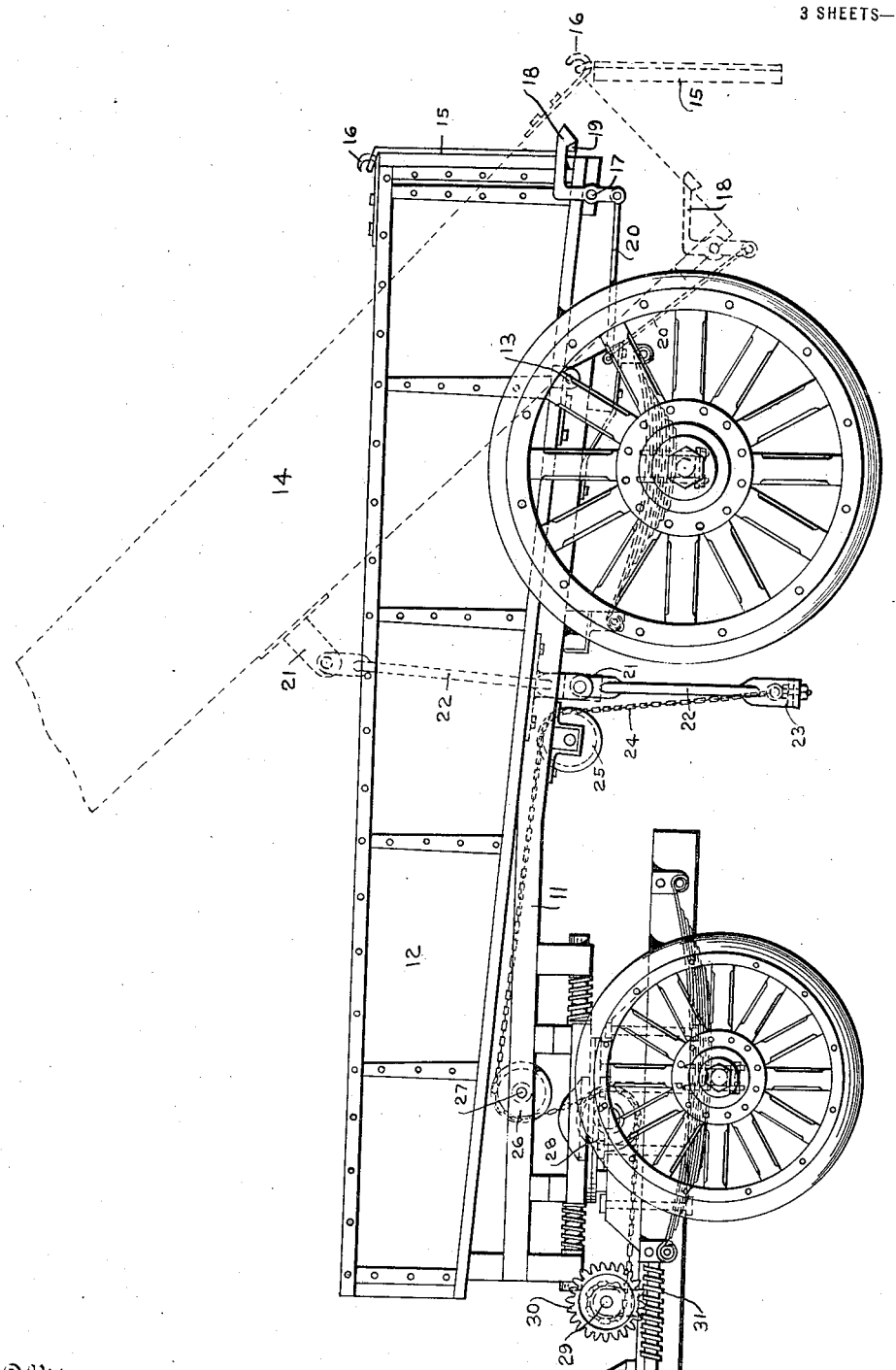

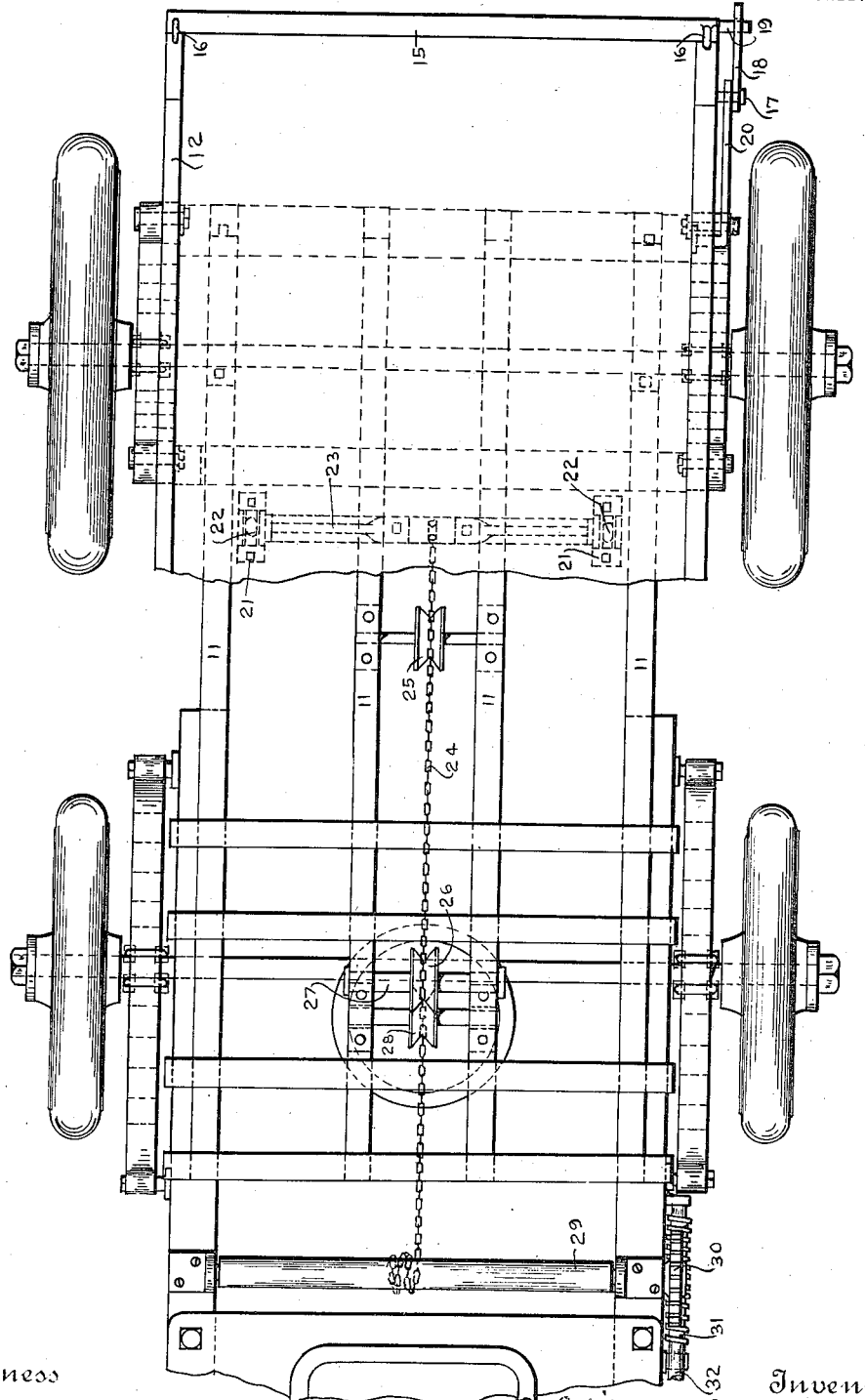

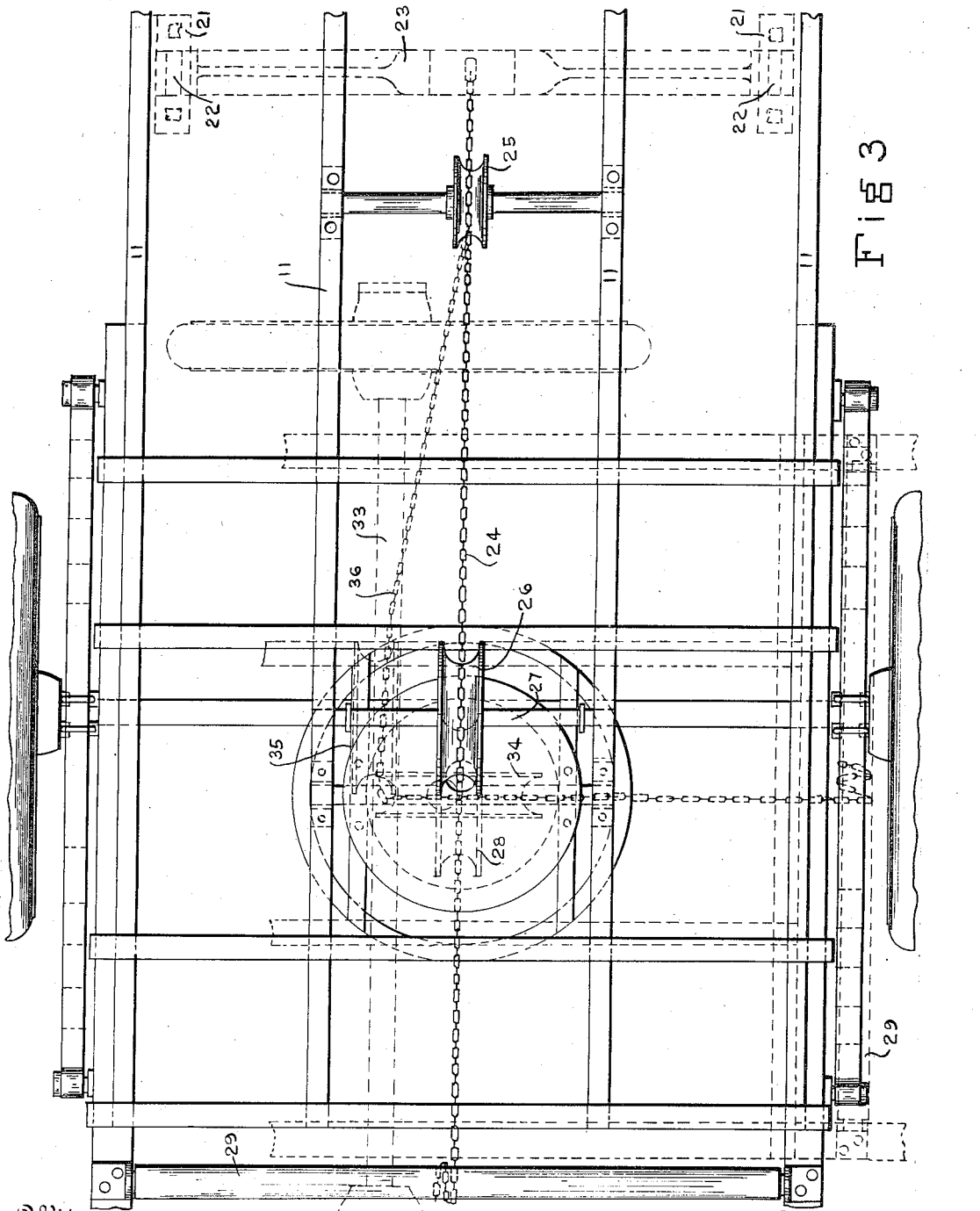

WILLIAM OSCAR SHADBOLT, OF NEW YORK, N. Y.

TRUCK.

1,170,004.   Specification of Letters Patent.   Patented Feb. 1, 1916.

Application filed June 28, 1915.  Serial No. 36,712.

*To all whom it may concern:*

Be it known that I, WILLIAM OSCAR SHADBOLT, a citizen of the United States, and a resident of the borough of Brooklyn, in the city and State of New York, have invented certain new and useful Improvements in Trucks, of which the following is a specification.

My invention relates to dumping trucks, and has for one of its principal objects to provide a truck in which the body portion is adapted to be elevated to dump the contents at the rear, the mechanism raising said body being operated from the front of the truck, and being always in operative position whichever way the front axle of the truck, or a tractor, in case the front end of the truck is supported thereby, is turned.

The invention consists in the novel construction, arrangement and combination of various devices, elements and parts, as shown in the accompanying drawings and hereinafter more particularly described.

In the said drawings, Figure 1 is a side elevation of my improved truck, showing its dumping position in dotted lines; Fig. 2 is a plan view of the same, a portion of the floor being removed to show the lower construction; and Fig. 3 is a plan view of the front portion of my invention, on an enlarged scale, the floor being entirely removed, and the position of the various parts when the front wheels are turned out of their normal position being shown in dotted lines.

In carrying my invention into effect in the embodiment thereof which I have selected for illustration in the accompanying drawings, I provide a main frame having a rear axle with wheels thereon, said main frame being connected by means of a fifth wheel of the usual or any suitable type with a front axle and wheels, which may either belong to the wagon or be part of a tractor, the form shown in the drawings being shown in use with a tractor.

Mounted on the frame 11 is a carrying body 12, so hinged thereto at 13 that it is capable of being tilted into the position shown in Fig. 1 by the dotted lines and designated 14. If desired, an automatic door may be provided at the back of the body, which, when the body is raised into the dumping position, will open and allow the contents to slide out. This device comprises a door proper 15, suspended from hooks 16. Pivoted at 17 on the under side of the movable body 12 is an L-shaped member 18 one end of which is adapted to engage with a laterally extending pin 19 on the door 15, and the other end of which is connected by means of a link 20 with the frame 11.

Secured to the under side of the body 12 are downwardly projecting members 21, to which are pivoted the upper ends of rods 22. The lower ends of these rods are connected together by a cross-bar 23, to which is secured one end of a chain 24. The chain 24 passes upward and over a pulley 25 mounted in the frame 11, then forward and over the pulley 26, which is loosely mounted on the shaft 27 and capable of sliding therealong, the said shaft 27 being mounted in the frame 11. The chain then passes downwardly and backwardly and under the pulley 28. This pulley 28 is mounted beneath the fifth wheel of the truck and on the tractor, so that it swings with the tractor, and when the tractor is in its normal position, as shown for instance in Fig. 2, the center of said pulley will be directly under the forward edge of the pulley 26. The chain then passes forward, and is wound around the drum 29, which is provided with a gear 30. This gear 30 is driven by a worm 31 on a forwardly extending shaft 32, which may be rotated either by a hand-crank, or be placed in gear with the tractor motor. If a tractor motor is used, an automatic shut-off may be provided if desired, whereby the rotation of the shaft may be stopped after the requisite number of turns have been made.

The operation of my invention is as follows: The parts of the wagon are normally in the position shown by the full lines in Fig. 1. When in this position the wagon may be loaded, and hauled from place to place by means of the tractor or otherwise. When it is desired to dump the load, the shaft 32 is rotated, rotating the drum 29 by means of the worm 31 and gear 30, the chain 24 is wound up, raising the cross-bar 23 and vertical rods 22, thus lifting the carrying body 12 into the position shown by the dotted lines in Fig. 1 and designated 14. As the body is raised, the link 20 pushes against the latch 18, raising it out of engagement with the pin 19, and allowing the door 15 to swing open by its weight. Similarly, when the wagon is lowered, the door will swing into its closed position and be engaged by the latch 18.

It often happens that it is desired to dump the contents of the truck when the front wheels or the tractor are not in their normal or hauling position. By means of the arrangement of the pulleys 26 and 28 it is possible to operate the dumping mechanism when the front wheels or tractor are in any position, as, for instance, that shown by the dotted lines in Fig. 3; as will now be described.

As the front axle of the truck or the tractor as the case may be, is swung, the pulley 28 will also swing, until when the axle or tractor is in the position shown by the dotted lines in Fig. 3, and designated 33, the pulley 28 will occupy the position shown by the dotted lines and designated 34. As the pulley 28 so swings, the pulley 26 slides along the shaft 27, until it occupies the position shown by the dotted lines and designated 35, the chain being displaced into the position designated 36. It will thus be seen that in whatever position the front axle or tractor may be, the chain 24 will always pass either vertically downward from the pulley 26, or downwardly and backwardly in varying degrees in a manner similar to that shown in Fig. 1. It will thus be seen that the chain will never have any tendency to slip sidewise off the pulley 26, as this pulley is capable of sliding to accommodate any sidewise pull of the chain; and that it will not slip off the pulley 28, as this pulley is mounted partly behind the pulley 26, so that the chain can never pass downward thereto with a forward inclination.

The advantages of my invention will be obvious from what has been above said concerning its construction and mode of operation.

I am aware that a construction is known in the art which operates as follows: A pump is located on a tractor and connected by means of a flexible pipe with a cylinder on a trailer. A piston operates in said cylinder and is provided with a rod which carries at its upper end a pulley. A chain has one end secured to the tilting body of the trailer, passes over the said pulley, and has its other end suitably secured. I therefore do not claim such a construction, but What I do claim as new and desire to secure by Letters Patent is as follows:

1. In a truck, the combination with running gear, a frame and a body pivotally secured to said frame; of means adapted to tilt said body, comprising a chain passing around a pulley on said frame, and around a pulley mounted on the front running gear, and means adapted to pull said chain.

2. In a truck, the combination with running gear, a frame, and a body pivotally secured on said frame; of means adapted to tilt said body, comprising devices extending downwardly therefrom, a chain having one end attached to said downwardly extending devices, passing around a pulley on said frame, around a pulley on the front running gear, and around a drum mounted on the front running gear.

3. In a truck, the combination with running gear, a frame and a body pivotally secured on said frame; of means adapted to tilt said body, said means comprising a chain passing around a pulley on said frame, around a second pulley on said frame around a pulley mounted on the front running gear, and around a drum mounted on the front running gear.

4. In a truck, the combination with running gear, a frame and a body pivotally secured on said frame; of means adapted to tilt said body, comprising a chain passing around a pulley on said frame, around a second pulley on said frame, said second pulley being adapted to slide transversely of the wagon, around a pulley mounted on the front running gear, and around a drum mounted on the front running gear.

5. In a truck, the combination with running gear, a frame, and a body pivotally secured on said frame; of means adapted to tilt said body, said means comprising a chain passing around a pulley on said frame, around a second pulley on said frame, around a pulley mounted on the front running gear, said last named pulley being normally located partly beneath said second named pulley, said chain being then wound around a drum mounted on the front running gear.

6. The combination with a tractor and a trailer pivotally connected together so as to be adapted to swing with relation to each other in a horizontal plane, said trailer being provided with a carrying body tiltably secured to the frame thereof; of means located on said trailer adapted to tilt the body thereon, means located on said tractor adapted to operate said tilting means, and means located intermediate said tilting body and said operating means whereby said tilting means may be operated irrespective of the angle at which said tractor and said trailer may lie with reference to each other.

7. The combination with a tractor and a trailer pivotally connected together so as to be adapted to swing with relation to each other in a horizontal plane, said trailer being provided with a carrying body tiltably secured to the frame thereof; of means located on said trailer and adapted to tilt the body thereon, and means located on said tractor adapted to operate said tilting means irrespective of the angle at which said tractor and said trailer may lie with reference to each other.

8. The combination with a tractor and a trailer pivotally connected together so as to be adapted to swing with relation to each other in a horizontal plane, said trailer being provided with a carrying body tiltably secured to the frame thereof; of a chain located on said trailer adapted to tilt the body thereon, means located entirely on said tractor adapted to operate said tilting means, and means located intermediate said tilting body and said operating means whereby said tilting means may be operated irrespective of the angle at which said tractor and said trailer may lie with reference to each other.

9. The combination with a tractor and a trailer pivotally connected together so as to be adapted to swing with relation to each other in a horizontal plane, said trailer being provided with a carrying body tiltably secured to the frame thereof; of a chain located on said trailer and adapted to tilt the body thereon, and means located entirely on said tractor adapted to operate said tilting means irrespective of the angle at which said tractor and said trailer may lie with reference to each other.

In witness whereof I have hereunto signed my name this 25th day of June 1915.

WILLIAM OSCAR SHADBOLT.